United States Patent
Copsey

(10) Patent No.: US 9,589,127 B2
(45) Date of Patent: Mar. 7, 2017

(54) SYSTEM AND METHOD FOR COLLABORATIVE AUTHENTICATION

(71) Applicant: Open Text SA ULC, Halifax (CA)

(72) Inventor: Simon Dominic Copsey, Horsham (GB)

(73) Assignee: Open Text SA ULC, Halifax (CA)

( * ) Notice: Subject to any disclaimer, the term of this patent is extended or adjusted under 35 U.S.C. 154(b) by 73 days.

(21) Appl. No.: 14/193,176

(22) Filed: Feb. 28, 2014

(65) Prior Publication Data

US 2014/0259129 A1 Sep. 11, 2014

Related U.S. Application Data

(60) Provisional application No. 61/775,162, filed on Mar. 8, 2013, provisional application No. 61/806,731, filed on Mar. 29, 2013.

(51) Int. Cl.
| | |
|---|---|
| *G06F 15/16* | (2006.01) |
| *H04L 29/06* | (2006.01) |
| *G06F 21/40* | (2013.01) |
| *G06F 21/31* | (2013.01) |
| *G06F 21/35* | (2013.01) |
| *H04W 12/06* | (2009.01) |

(52) U.S. Cl.
CPC .............. *G06F 21/40* (2013.01); *G06F 21/31* (2013.01); *G06F 21/35* (2013.01); *H04L 63/0884* (2013.01); *H04W 12/06* (2013.01); *G06F 2221/2111* (2013.01); *G06F 2221/2115* (2013.01)

(58) Field of Classification Search
None
See application file for complete search history.

(56) References Cited

U.S. PATENT DOCUMENTS

| | | | | |
|---|---|---|---|---|
| 2003/0061350 | A1* | 3/2003 | Masuoka | ............ H04L 63/0428 709/225 |
| 2011/0219427 | A1* | 9/2011 | Hito | ........................ G06F 21/00 726/3 |
| 2011/0300802 | A1* | 12/2011 | Proctor, Jr. | ........ G06Q 30/0623 455/41.2 |

* cited by examiner

*Primary Examiner* — Fatoumata Traore

(74) *Attorney, Agent, or Firm* — Sprinkle IP Law Group

(57) ABSTRACT

Systems and methods are disclosed for collaborative authentication of a person based on an interaction with another person. A request for collaborative authentication is sent to the computing device of a person wanting to access a system, including an authentication ID unique to the request. The person collaborates with another person associated with the system and provides the second person with the authentication ID. The second person sends the authentication ID to the system such that the system associates the second person with the first person. Data is sent to the second person in order to challenge the first person. The first person responds to the challenge using the computing device and the system receives the response. The system compares the response to an expected answer and can either allow or deny the first person access to the system based on the comparison. Co-location may also be verified.

41 Claims, 7 Drawing Sheets

SYSTEM AND METHOD FOR COLLABORATIVE AUTHENTICATION

RELATED APPLICATIONS

This application claims the benefit of U.S. Provisional Patent Application Ser. No. 61/775,162 by Simon Copsey, entitled "System and Method for Collaborative Authentication" filed on Mar. 8, 2013, and also claims the benefit of U.S. Provisional Patent Application Ser. No. 61/806,731 by Simon Copsey, entitled "System and Method for Collaborative Authentication" filed on Mar. 29, 2013, both of which are fully incorporated herein by reference for all purposes.

TECHNICAL FIELD

This disclosure relates generally to systems and methods for implementing security in conjunction with computing devices. Specifically, this disclosure relates to systems and methods for use in the authentication of users of computing devices.

BACKGROUND

The world is becoming increasingly dependent on mobile devices for business uses. People are now able to view not only websites, but documents, spreadsheets, PDFs and other files or information, using a smartphone, tablet, PDA or other mobile computing devices.

With this increased ability to access information from mobile computing devices, there is also a risk that information may be accessed by someone using a mobile computing device without the knowledge or authorization by the enterprise. For example, a person who is authorized to access sensitive information may lose a smartphone, have a tablet stolen, or otherwise not have possession of his/her mobile computing device. Or, an unscrupulous employee may want to access the system for information to sell to another enterprise. Other scenarios are possible in which a user or a mobile computing device associated with a user may be used to try to gain unauthorized access to information stored in a server, system or infrastructure associated with an enterprise.

To prevent unauthorized access to servers or systems containing sensitive information, an enterprise will usually implement some form of authentication. Commonly, a user wanting access to a server enters a username and a password. However, this system has limitations. For example, a username or password may be given to another person, written down on a piece of paper and then be discovered by someone else, guessed, or otherwise be compromised.

SUMMARY OF THE DISCLOSURE

Embodiments of a collaborative authentication system provide a means for authenticating a user wanting access to a system through collaboration with an authorized user of that system.

One embodiment may include a method for collaborative authentication of a user. The method may include sending an authentication identifier to a collaborative authentication participate, receiving a message containing the authentication identifier from a collaborative authenticator, sending authentication data to a second computing device based on receiving the message, the authentication data comprising a challenge relating to the user, receiving an authentication response comprising a response to the challenge and providing an authentication notification to the user based on the authentication response.

Another embodiment may comprise a collaborative authentication system that comprises a processor and a non-transitory computer readable medium accessible by the processor. The computer readable medium may store a set of computer instructions executable by the processor to perform a method that includes generating an authentication identifier associated with the user at a first computing device, sending the authentication identifier to a collaborative authentication participant, receiving a message including the authentication identifier from a collaborative authenticator, sending authentication data to a second computing device based on the authentication identifier, the authentication data comprising a challenge, receiving an authentication response comprising a response to the challenge and providing an authentication notification to the user based on the authentication response.

Embodiments may include one or more levels of collaborative authentication. According to one embodiment, receiving the authentication identifier from the collaborative authenticator comprises receiving the authentication identifier from a first collaborative authenticator at a third computing device and sending authentication data to the second computing comprises providing the authentication data to a second collaborative authenticator.

Another embodiment may comprise a method of collaborative authentication comprising at a security module executing on a computer: generating an authentication identifier associated with a candidate user requiring authentication, sending said authentication identifier to a collaborative authentication participant, receiving the authentication identifier associated with the candidate user from an authenticating user, sending authentication information to the authenticating user, said authentication information comprising a challenge related to the candidate user, receiving a response comprising a response to the challenge and based on said response to the challenge, determining whether to authenticate the candidate user.

The authenticating user can include a plurality of authenticating users including a mediator user and a selected authenticating user. The authentication identifier can be sent to the mediator user. The authentication information can be sent, in one embodiment, to the selected authenticating user the response to the challenge can be received from the selected authenticating user.

These and other features and advantages will be set forth in the description that follows, and will in part be obvious from the description, or may be learned by practice of the invention. Features and advantages may be realized and obtained by means of the instruments and combinations pointed out in the appended claims.

DETAILED DESCRIPTION

Figure 1:
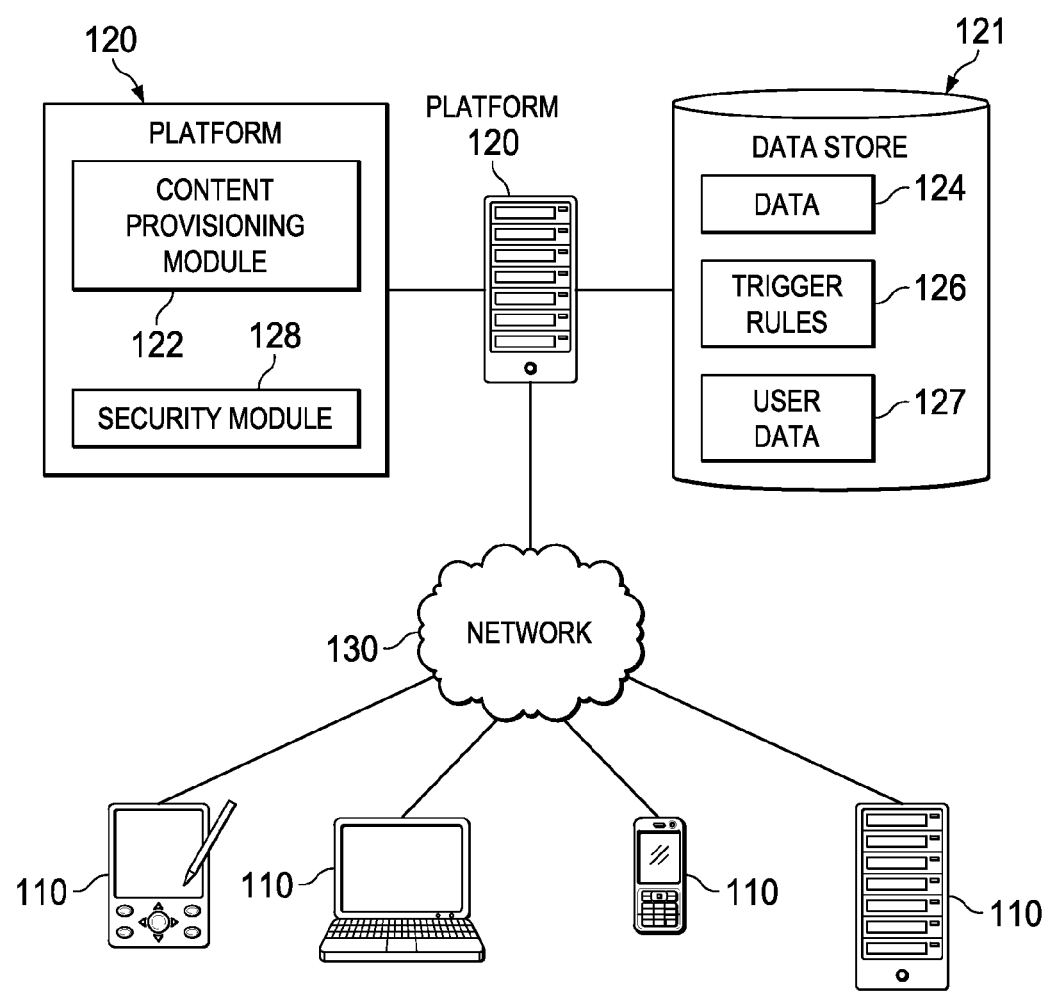
FIG. 1 is a block diagram illustrating one embodiment of a topology for collaborative authentication.

Systems and methods of collaborative authentication and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of this disclosure will become apparent to those skilled in the art from this disclosure.

Before delving into more detail regarding the specific embodiments disclosed herein, some brief context may be helpful. In today's communication environment, the reliance on computing devices is growing ever greater. In particular, mobile computing devices (or just mobile devices) such as cellular phones, smart phones, laptops, PDA's, etc., are increasingly the way users conduct a wide variety of their business. Thus, users may utilize their mobile device to access a wide variety of data from a wide variety of content providers.

In many cases, these content providers may be a business related to the user (e.g., the user's employer) or another content provider (e.g., financial institution, medical provider, etc.) that is providing sensitive information to the user at their mobile device. These mobile devices present a quandary to such content providers. While it is increasingly desired by users to receive content at their mobile devices such mobile devices present a significant security concern for content providers. These security concerns stem in large part from the same qualities that have served to increase their popularity, namely their very mobility. As these devices are small, portable, wireless, etc., they may easily be lost, misplaced, randomly stolen, or intentionally purloined. Thus, unauthorized users may have access to a mobile device.

As these mobile devices may have applications or other method that may have been previously configured to access particular content or a particular content provider, the unauthorized user may have access to such content solely by virtue of possession of such a device.

As can be seen then, security measures which attempt to secure content or access to a content provider through authentication of a mobile device itself (e.g., ensuring that the device is authorized to access content or the content provider) may be woefully inadequate, as such mobile devices may be easily obtained by an unauthorized user.

It is thus desired by content providers to be able to authenticate the actual user of the mobile device (instead of, or in addition to, the mobile device itself). Authorized users may, however, view such security as an inconvenience. What is needed then, is a simple, straightforward and relatively quick method of authenticating users of mobile (or almost any other type of computing) devices. For purposes of this disclosure it will be understood that the terms authorize and authenticate will be used interchangeably herein.

To that end, attention is thus directed to the embodiments of the systems and methods for collaborative authentication. Specifically, embodiments as disclosed may use one or more collaborative authenticators to authenticate a user, who may be referred to as a candidate user. In particular, according to certain embodiments, an authentication trigger may occur which initiates a collaborative authentication of a user. The user may be requested to perform a collaborative authentication and provided with an authentication identifier. The user may then locate another user (referred to as a collaborative authenticator and/or an authenticating user) and provide the authentication identifier to the collaborative authenticator. The collaborative authenticator may, in turn, provide the authentication identifier to the content provider. The content provider may then provide the collaborative authenticator with some form of authentication data as will be discussed in more detail later. The collaborative authenticator communicates with the user in order to allow the user to be authenticated (or fail to be authenticated) by the content provider. Additionally, in some embodiments, the physical proximity (also referred to as co-location) of the collaborative authenticator and the user may be verified.

The collaborative authenticator may also provide an authentication response (e.g., authenticate or not) to the content provider. Additionally, the collaborative authenticator may provide additional data, such as a password or the like, which serves to identify or authenticate the collaborative authenticator. Based on the authentication response provided by the collaborative authenticator (and possibly the additional data provided by the collaborative authenticator), an authentication notification response may be provided to the user who is being authenticated. Such a notification may be providing the user with requested data, allowing a requested access, an e-mail, or a wide variety of other actions.

In some instances, content providers may be concerned about the possibility of collaboration or collusion between the user whom it is desired to authenticate and the collaborative authenticator in cases where the user is allowed to select the collaborative authenticator. To ameliorate these concerns, in some embodiments, a collaborative authenticator to utilize in the authentication process may be provided to the user when the user is requested to perform a collaborative authentication.

A collaborative authenticator to utilize may be determined based on almost any criterion (or combination of criteria) desired, including almost any type of location or presence information associated with prospective collaborative authenticators including, for example, physical proximity to the user. Almost any other type of data associated with prospective collaborative authenticators (or the user to be authenticated) may also be utilized, such as, for example, a security level or other data associated with prospective collaborative authenticators or the user, employment information, etc.

In these types of embodiments the user may also be provided with the location of the provided collaborative authenticator in order to facilitate the user's location of the collaborative authenticator. Using the provided location information the user may locate the collaborative authenticator and provide the authentication identifier to that collaborative authenticator. The collaborative authentication process may then take place substantially as described above.

In certain embodiments, the collaborative authentication process may involve multiple collaborative authenticators. Specifically, in one embodiment, a first collaborative authenticator (who may be referred to as a mediator user) may control or mediate the collaborative authentication between the user and a second collaborative authenticator. In such embodiments the first collaborative authenticator may be yet another check in the process and could further thwart the user's attempt to use a collaborative authenticator who is fraudulent. With additional collaborative authenticators added to the process the likelihood of any type of fraud in the collaborative authentication process can be further reduced.

More particularly, in certain embodiments, the authentication request and identifier may be provided to a first collaborative authenticator who locates the user to be authenticated. The user may then indicate to the first collaborative authenticator that they wish to be authenticated by a second collaborative authenticator. The first collaborative authenticator may then provide the authentication identifier along with an identification of the second collaborative authenticator (or the second collaborative authenticator's device). The authentication data can then be provided to the second collaborative authenticator (e.g., at their computing device). The first collaborative authenticator may then communicate with the system and the user in order for the system to authenticate (or fail to authenticate) the user. Additionally, in some embodiments, the physical proximity (also referred to as co-location) of the second collaborative authenticator and the user may be verified, for example, by the first collaborative authenticator. An authentication notification response may then be provided to the user who is being authenticated as discussed above.

As discussed above, in some embodiments it may be desired to provide the collaborative authenticator to utilize. Accordingly, in embodiments that utilize multiple collaborative authenticators, one or more, or all, of the collaborative authenticators may be provided. For example, as discussed, the first collaborative authenticator may be determined and the authentication request and identifier provided to the first collaborative authenticator. Additionally, then, in some embodiments the second collaborative authenticator may be determined and provided (e.g., to the user or the first collaborative authenticator) for use in authentication of the user. For example, in these types of embodiments the first collaborative authenticator may be determined and provided with the authentication request, identifier, identity and location of the user and identity and location of the second collaborative authenticator. The collaborative authentication process may then take place substantially as described above.

As may be realized from the descriptions herein, embodiments as disclosed may have the considerable advantage that authentication data is being sent from the content provider to the collaborative authenticator, such that in order to falsely authenticate, a user requires the collaboration of two (or more) individuals. This significantly reduces the probability of illegitimate authentication. Additionally, as the authentication data is being sent from the content provider, the authentication data may be essentially any piece of information associated with the user. Furthermore, such a collaborative authentication process may take a relatively short amount of time and may not pose a significant inconvenience for a user. As such, collaborative authentication can be performed in addition to any other security procedures (e.g., random number key fob authentication).

Accordingly, embodiments may be utilized in a wide variety of contexts and in conjunction with a wide variety of computing devices (whether mobile or otherwise). For example, while embodiments may be usefully applied to a user at a mobile device accessing a content provider, other embodiments may also be usefully applied to authentication users at security checkpoints, point of sale or other retail locations, etc.

A collaborative authentication method may be implemented based on mandatory sign on requirements, initiated by an authorized operator or administrator of a designated system, based on unusual access patterns of the individual requesting access to a designated system or information stored in the designated system, may be implemented automatically on a recurring basis (e.g., monthly, quarterly, etc.), may be implemented automatically as a result of a change in location (e.g., new location, unknown location, etc.), may be implemented based on a level of access the user is trying to gain, or the like.

Embodiments allow authorized users of a designated system or information stored on the system to have knowledge of access requests made by other possible users, increasing the overall security of the business or enterprise associated with the system or information.

FIG. 1 depicts one embodiment of topology in which such collaborative authentication may be useful. The topology includes one or more computing devices 110 connected to a content provisioning platform 120 over a network 130. The network 130 may be a wired or wireless network such as the Internet, an intranet, a LAN, a WAN, a cellular network, or another type of network. It will be understood that network 130 may be a combination of multiple different kinds of wired or wireless networks.

Computing devices 110 may be mobile devices such as smartphones, laptop computers, personal data assistants (PDAs), desktop or other computing platforms, or any other type of device that can process instructions and connect to network 130.

Each content provisioning platform 120 may include one or more servers executing one or more server applications to provide content provisioning modules 122 accessible at one or more locations (e.g., IP addresses or domain names). The server applications of a particular platform 120 may be deployed on physical computing devices residing at a particular location (such as those associated with the provider of a particular mobile application) or may be deployed in a cloud. A cloud (or cloud computing) may, for example, involve the use of computing resources that are delivered as a service over a network (for example, over the Internet). Thus, when a platform 120 is deployed in the cloud, the server application(s) may be executing on a virtual machine provided in the cloud by one or more physical servers, where the virtual machine is addressable at a single location.

Regardless of the location of the platform 120, the server applications of a platform may be used to support access from computing devices 110. In other words, users at computing devices 110 may use the computing device 110 to access platform 120 using for example, a browser on the computing device, a proprietary application on computing device 110, a generic interface, etc. In response to such access, content provisioning module 122 may provide data 124 from data store 121 to the accessing computing device 110. Thus, for example, platform 120 may include a server at an organization that allows a user at a computing device 110 affiliated with the organization to access files in a file store.

Alternatively, platform 120 may be a web server configured to provide users at computing devices 110 web content in response to a request received from a browser. As another example, platform 120 may support one or more applications deployed on a computing device 110. More specifically, an application deployed on a computing device 110 may contact the platform 120, in return the platform 120 returns content or other data to the application on the computing device 110 where it may be rendered for presentation to the user, or used in other functionality performed by the application on the computing device 110.

As can be seen then, regardless of the actual functionality or use of such a platform 120, these types of platforms may provide access to data to users at computing devices 110, at least some of which may be mobile devices. As discussed above then, the platforms 120 may be providing sensitive data to users at their mobile devices and thus, operators of such platform 120 may have concerns associated with the provisioning of such data.

It is thus desired by operators of platform 120 to be able to authenticate the actual user of computing devices 110 (instead of, or in addition to, the device itself). Accordingly, platform 120 may also include security module 128 configured to perform collaborative authentication of a user of a computing device 110. It will be noted here that although security module 128 and the associated user data 127 and trigger rules 126 may be included in platform 120, security module 128 may also be deployed on one or more other computing devices which may be coupled to platform 120 over network 130, such as a proxy server or the like. Additionally, user data 127 and trigger rules 126 may be distributed between or among computing devices 110 such that authentication of a user on one device 110 may involve accessing user data 127, trigger rules 126 from multiple computing devices 110 when performing a collaborative authentication.

Security module 128 may be configured to utilize the set of trigger rules 126 to determine when a collaborative authentication should be initiated in conjunction with a user at a computing device 110. Trigger rules 126 may be time based such that, for example, a collaborative authentication of a user of computing device 110 is automatically initiated on a recurring basis (e.g., monthly, quarterly, yearly, etc.). Trigger rules 126 may also include manual initiation of the collaborative authentication by operators or administrators of platform 120. Additionally, trigger rules 126 may be event based. For example, a collaborative authentication may be initiated at sign on, or may be initiated if certain (e.g., unusual) usage patterns are detected such as many accesses to a certain location or over a certain time period or during certain time periods (e.g., late evening, on a weekend, during a holiday, etc.); may be initiated based on a significant change in location or access from an unusual or different location, which may, for example, be detected using the GPS in a mobile device; may be initiated by access to certain files or certain types of accesses (e.g., requesting deletion of a file or files), content, locations, etc.

These examples of trigger rules 126 are provided by way of example only and it will be apparent that almost any type of rule which may initiate a collaborative authentication is encompassed by embodiments as disclosed herein. In certain embodiments, security module 128 may include a monitoring module to detect the occurrence of such trigger conditions by evaluating one or more criteria associated with an access attempt against one or more of trigger rules 126. This monitoring module may work, for example, in conjunction with a security plug-in that is a part of the application on computing device 110 being used to access data 124 using content provisioning module 122 on computing device 110. Such a plug-in may, for example, have been selected or otherwise included in the application by a developer of the application in order that security may be implemented in conjunction with the deployment and use of the application.

When a collaborative authentication is initiated by security module 128 in association with a user at computing device 110, security module 128 may be configured to send a collaborative authentication request to computing device 110. Such a request may, for example, be sent through an application on computing device 110 through which the platform 120 is being accessed, may be sent through a web based interface provided by security module 128 (e.g., if the platform is a web server), may be delivered by e-mail to an e-mail address associated with a putative user of computing device 110, or by another technique. Such a request may be received at computing device 110 or otherwise and communicated to the user.

This request may include an authentication identifier to be used for the collaborative authentication of the user at that computing device 110. Such an identifier may be, for example, a (randomly generated, sequential, etc.) number, an alphanumeric string, an N digit number, a key_id in a database for the collaborative authentication or other secure transaction, a QR code that is presented, or another type of identifier, such that such the identifier may be substantially unique to a particular collaborative authentication. The authentication identifier may be stored by security module 128 and associated with the collaborative authentication of the user at that computing device 110. Additionally, the request may inform the user of computing device 110 that a collaborative authentication is being requested and may also provide instructions to a user on how to conduct the collaborative authentication process.

For example, the user may be instructed to locate a collaborative authenticator and provide the authentication identifier to the collaborative authenticator. There may be criteria associated with the collaborative authenticator, such that a user may be instructed to locate a collaborative authenticator that has access to the same platform 120, is in the same or a different department at their place of employment, etc. The user may be provided with a list of possible collaborative authenticators.

In some cases, the user may select the collaborative authenticator at the user's computing device to indicate the collaborative authenticator to security module 128. In other embodiments, receipt by security module 128 of the authentication identifier from a collaborative authenticator can show the selection of the collaborative authenticator.

Alternatively, an identity of a collaborative authenticator to utilize may be provided in the collaborative authentication request sent by security module to the computing device 110. In such embodiments, security module may be configured to select such a collaborative authenticator based on user data 127, co-location of the candidate user and the authenticating user, or other information.

User data 127 may include data on users of platform 120, including, for example their employment information, security level, position, etc. One particular type of data may include presence or location (collectively presence data) associated with a user. Such presence data may be determined using almost any means desired, such as a user's login information (e.g., is the user logged in at his computing device 110), GPS data associated with the user determined from computing device 110 (or otherwise), wireless network information (e.g., data determined by a device's proximity to one or more wireless access points, etc.), video data from a camera, etc. Another type of data that may be associated with a user in user data 127 is a user's security level. Such security data may, for example, a security level associated with a user group for user with a directory access protocol (e.g., LDAP or the like).

Accordingly, security module 128 may be configured to determine a user of the platform to be selected as a collaborative authenticator based on user data 127 associated with these users. The algorithm or criteria to be utilized in such a determination may be almost any desired. For example, in some embodiments it may be desired to select as a collaborative authenticator a user who has a relatively high security level, is in a different department than, but is in relatively close physical proximity to, the user whom it is desired to authenticate. In such cases where presence data about the determined collaborative authenticator is present or available, in addition to including an identity of the collaborative authenticator, a location of the collaborative authenticator may also be provided in the collaborative authentication request.

In any event, the security module 128 may be configured to provide an interface which may be accessed by a collaborative authenticator (e.g., a web interface, an interface accessed through a proprietary application resident on computing device 110, etc.) which may be used by a collaborative authenticator, whether determined by security module and provided to the user or selected by the user. Such an interface may be accessed from computing device 110 of the collaborative authenticator. The collaborative authentication interface may be configured to present an interface through which a collaborative authenticator may initiate a collaborative authentication process and provide the authentication identifier. The collaborative authentication interface may be configured to provide instructions to a user on how to initiate the collaborative authentication process.

Security module 128 may be configured to authorize the collaborative authenticator for participation in the collaborative authentication process. For example, by requiring a username and password or other identifying information from the collaborative authenticator.

Security module 128 may also be configured to provide a collaborative authenticator (e.g., once the collaborative authenticator has been authorized to participate) a reply comprising authentication data. This authentication data may include a challenge mechanism such as a photograph of the user by which the collaborative authenticator may authenticate the user, one or more questions for a collaborative authenticator to pose to the user, such questions including personal and private information of the user that presumably only the user (or a very limited number of close associates, family members, etc.) has knowledge of (e.g., what is your mother's maiden name, what was the name of your first pet, what is your desk number or employee id number, what is the fourth digit of your social security number, etc.). Such one or more questions may include predetermined security questions to pose to the user.

The security questions may have corresponding stored answers that security module 128 can use as part of collaborative authentication. In some embodiments, predetermined security questions are stored and posed to the user before security module 128 initiates collaborative authentication for the user. Here, a mechanism exists to allow the one or more predetermined security questions to be posed to the user and to receive answers to questions from the user. The answers may be stored and used as part of the collaborative authentication mechanism.

Moreover, information entered for other purposes may be used as part of the collaborative authentication mechanism. In some embodiments, such information for a user that is used as part of collaborative authentication may be stored independently for collaborative authentication. For example, a social security number (or portion thereof) stored for payroll tracking may be copied to independent storage for use as a stored answer in collaborative authentication. In other cases, the same storage may be used for multiple purposes such that, for example, the same stored social security number is accessed for payroll processing and collaborative authentication. In some embodiments, security module 128 may request stored answers from various systems storing the information as needed. For example, security module 128 may request a user's social security number (or portion thereof) from a payroll system during a collaborative authentication session.

During collaborative authentication, a response to a challenge including a response to the predetermined security question may be compared to the stored answer to the security question. Such a comparison may include determining whether the received response (a text string, for example) matches the stored answer (another text string). User authentication may be based at least in part on the results of the comparison.

In some embodiments, a collaborative authenticator may be required to use judgment. For example, if a photograph of a person is sent to a collaborative authenticator, the collaborative authenticator may be asked if the photograph is a photo of the requester, or may be asked how confident they are that this photograph is a photo of the requester. If the requester is hiding part of his face, looks nervous or otherwise gives the collaborative authenticator a reason to doubt his identity, embodiments allow the collaborative authenticator to relay that information to the security system.

In some embodiments, video may be used in lieu of still photographs. For example, the security module 128 may establish a video conferencing session between the collaborative authenticator and the user being authenticated or may provide the collaborative authenticator and user with details on how to establish a video conference through a third party service.

The challenge mechanism may be determined or selected based on user data 127 associated with the user (e.g., the user being authenticated). User data 127 may include data from a human resources database, such as name, SSN, employee ID, the date the user started working for the company, the department in which the user works, the user's immediate supervisor, or some other information found in a human resources database that can be used to identify the user. In some embodiments, the user data 127 may include a set of predetermined or already agreed upon information or questions.

In certain embodiments, the authentication identifier received may be used to locate the associated authentication process being executed by the security module 128. The computing device 110 associated with the authentication process may be determined and the user data 127 associated with that computing device 110 may be determined for inclusion in the challenge mechanism or other authentication data.

The authentication data may include reminders to the collaborative authenticator of the consequences (e.g., to himself or the company) or the implications of falsely authenticating the user, or additional information about why collaborative authentication of the user is being performed (e.g., attempted accesses or actions by the user). This data can alert the collaborative authenticator to the user's actions (e.g., "the user is attempting to wipe all content from the system") and thereby highlight the consequences of such an authentication process.

Security module 128 may also be configured to verify the co-location of the user and the collaborative authenticator to ensure that they are within some distance of one another as the authentication process is being performed. Security module 128 may send a request to verify co-location of the candidate user and the authenticating user to the authenticating user or candidate user and receive a response from the authenticating user or candidate user verifying co-location of the candidate user and the authenticating user.

Co-location verification may be performed using a communication technique such as near field communication technique or Bluetooth, or the like, on the collaborative authenticator's computing device 110, the user's computing device 110 or both, to determine that the user's computing device 110 and the collaborative authenticator's computing device 110 are within some distance of one another (e.g., 5 feet, 20 feet, 100 feet, in the same building, etc.). Such co-location could also be performed by other techniques as well, such as by GPS or the like. According to one embodiment, security module 128 can receive location information related to the candidate user, location information related to the authenticating user; and compare the location information of the candidate user and the location information of the authenticating user to verify co-location.

In some embodiments, a Bluetooth scan may provide information on all other devices within some distance of a device 110 associated with a user requesting access, a collaborative authenticator, or both. In some embodiments, a first computing device 110 may display a QR code received from platform 120 and co-location verification may involve the second user using a camera function on their device 110 to capture the QR code and send the captured QR code to platform 120. If the QR code received from the computing second device 110 matches the QR code sent to the first computing device 110, co-location may be verified.

Security module 128 is thus configured to present an interface through which an authentication response may be received from the collaborative authenticator's computing device 110 or the user's computing device 110. This authentication response may be a simple yes/no authentication sent by the collaborative authenticator, or may include the user's response to authentication questions (e.g., mother's maiden name, employee ID, etc.) sent from the user's computing device 110 such that security module 128 may verify such data against data associated with the user of the mobile device in data store 121.

Embodiments may operate to include a collaborative authenticator in the authentication process without the collaborative authenticator being privy to the user's personal information. For example, even though the collaborative authenticator may be instructed to contact the user and ask the user for his mother's maiden name or part of a Social Security number, the user does not give the response to the collaborative authenticator but instead sends the response to security module 128, which may be accomplished using a non-specific field (e.g., a plain text field, a multiple choice option, etc.) presented via a user interface, an e-mail, or some other form of secure communication between the requesting user's computing device 110 and platform 120. Thus, security module 128 is able to determine whether to authenticate a user using personal information for the user in conjunction with a collaborative authenticator, without providing the user's personal information to the collaborative authenticator.

Thus, in some embodiments, challenges may be presented in an interface provided to the collaborative authenticator, but not in the interface provided to the requesting user. A non-specific field or other mechanism can be presented to the requesting user to allow the requesting user to provide an answer without the answer passing through the collaborative authenticator's computing device 110.

It may be noted that the collaborative authenticator may not know the answer to the challenge question. For example, if the collaborative authenticator is asked to pose a question regarding the maiden name of the user's mother, the collaborative authenticator may not know the answer. However, if the requesting user inputs the correct answer (e.g., at the requesting user's computing device 110), the user may be authenticated.

The interface presented to the collaborative authenticator may allow the collaborative authenticator to update authentication data associated with the user, for example, by uploading a new image of the user from the collaborative authenticator's computing device 110, supplying the answer to new authentication questions, updating answers to authentication questions, etc.

For example, a requester may grow a beard, change hairstyles, etc. In some embodiments, a collaborative authenticator may take a photograph of a requester and upload the photograph to a security system. Facial recognition software may compare the new photograph with an existing photograph and update the requester's file to include the new photograph or other information.

Additionally, the security module 128 may provide an interface through which the collaborative authenticator may provide additional data from his computing device 110, such as a password or the like, which serves to identify or authenticate the collaborative authenticator (e.g., if the collaborative authenticator has not been previously authorized). By authenticating the collaborative authenticator as well, someone with access to two devices may be prevented from participating in the authentication of a device without the approval of the owner of a device being used to support the collaborative authentication.

Based on the authentication response provided by the collaborative authenticator (and possibly the additional data provided by the collaborative authenticator or verification of the co-location of the computing devices 110), security module 128 is configured to provide an authentication notification response to the user who is being authenticated. Such a notification may include providing the user with requested data, allowing a requested access, denying a requested access (e.g., denying access to content provisioning module 122 or data 124), disabling the computing device 110 of the user, an e-mail, generation of a security alert to a security office associated with platform 120, or a wide variety of other actions.

Figure 2:
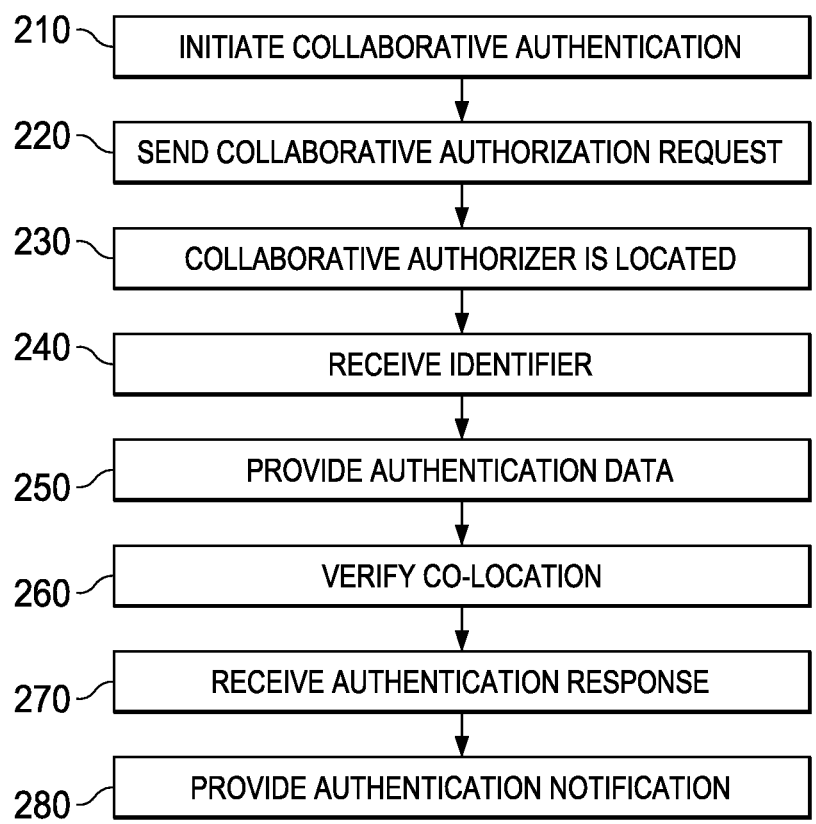
FIG. 2 is a block diagram illustrating one embodiment of a method for collaborative authentication.

Moving now to FIG. 2, one embodiment of a method for collaborative authentication, at least some steps of which may be performed by embodiments of a security module (e.g., security module 128 of FIG. 1 or some other security module), is depicted. Initially at step 210 a collaborative authentication may be initiated. The collaborative authentication may be triggered based on one or more detected conditions. These conditions may be time based such that for example, a collaborative authentication of a user is automatically initiated on a recurring basis (e.g., monthly, quarterly, yearly, etc.). These conditions may also be manually met, such that a collaborative authentication may be initiated by operators or administrators of a system. Additionally, conditions may be event based. For example, a collaborative authentication may be initiated at sign on by a user, or may be initiated if certain (e.g., unusual) usage patterns are detected such as many accesses to a certain location or over a certain time period; may be initiated based on a significant change in location or access from an unusual or different location, which may for example, be detected using the GPS in a mobile device; may be initiated by access to certain files or certain types of accesses (e.g., requesting deletion of a file or files), content, locations, etc.

After a collaborative authentication is initiated, at step 220 a collaborative authentication request may be sent to a user. Such a request may, for example, be sent through an application on the computing device through which the user is attempting access. Such a request may present a message to the user that a collaborative authentication has been initiated and that he should locate a collaborative authenticator.

Furthermore, the request may include an authentication identifier to be used for the collaborative authentication and may also provide instructions to a user on how to conduct the collaborative authentication process. For example, the user may be instructed to locate a collaborative authenticator and provide the authentication identifier to the collaborative authenticator. Such an authentication identifier may be, for example, a (randomly generated, sequential, etc.) number, an alphanumeric string, an N digit number, a key_id in a database for the collaborative authentication or other secure transaction, a QR code that is presented, or another type of identifier, such that such the identifier may be substantially unique to a particular collaborative authentication.

Alternatively, an identity of a collaborative authenticator to utilize may be provided in the collaborative authentication request sent to the user. Here, the collaborative authenticator may be determined based on data associated with prospective collaborative authenticators. These prospective collaborative authenticators may be other users of the system which the user who is being authenticated is attempting to access. As discussed above, the data utilized in making such a determination may include, for example user's employment information, security level, position, presence data, etc. The algorithm or criteria to be utilized in such a determination may be almost any desired.

For example, in some embodiments it may be desired to select as a collaborative authenticator a user who has a relatively high security level, is in a different department than, but is in relatively close physical proximity to, the user whom it is desired to authenticate. In such cases where presence data about the determined collaborative authenticator is present or available, in addition to including an identity of the collaborative authenticator in the collaborative authentication request, the location of the collaborative authenticator may also be provided in the collaborative authentication request sent to the user.

The user may then locate a collaborative authenticator at step 230. For example, if the collaborative authentication request does not specify the identity of a collaborative authenticator the user may locate someone who he wishes to use as a collaborative authenticator (e.g., by walking down the hall to a co-worker's office) while if a collaborative authenticator has been provided in the collaborative authentication request the user may use the location information associated with the provided collaborative authenticator to locate the provided collaborative authenticator. In some cases, the user does not physically locate the collaborative authenticator, but is put in touch with the collaborative authenticator through one or more communication channels.

Once a collaborative authenticator is located the authentication identifier may be received from the collaborative authenticator at 240. In one embodiment, an interface or application which may be accessed by the collaborative authenticator (e.g., a web interface, an interface accessed through a proprietary application resident on the computing device of the collaborative authenticator, etc.) may be provided. This collaborative authentication interface may be configured to present an interface through which a collaborative authenticator may initiate the collaborative authentication process or provide the authentication identifier.

Additionally, in some embodiments, the collaborative authenticator may himself be authenticated for participation in the collaborative authentication process. For example, by requiring a username and password or other identifying information from the collaborative authenticator.

Next, at step 250, the collaborative authenticator may be provided with authentication data. This authentication data may include a challenge mechanism such as a photograph of the user by which the collaborative authenticator may authenticate the user, one or more questions for a collaborative authenticator to pose to the user (e.g., what is your mother's maiden name, what is your desk number of employee id number, etc.). In another embodiment, a video conference may be established between the collaborative authenticator and the user to be authenticated.

Additionally, this authentication data may include reminders to the collaborative authenticator of the consequences (e.g., to himself or the company) or the implications of falsely authenticating the user, or additional information about why collaborative authentication of the user is being performed (e.g., attempted accesses or actions by the user). This would alert the collaborative authenticator to the user's actions (e.g., "the user is attempting to wipe all content from the system") and thereby highlight the consequences of such an authentication process.

The co-location of the user and the collaborative authenticator may be verified at step 260 to ensure that they are within some distance of one another as the authentication process is being performed. This co-location verification may be performed using a communication technique such as near filed communication technique, Bluetooth, or the like on the collaborative authenticator's computing device, the user's computing device or both, to determine that the user's computing device and the collaborative authenticator's computing device (or the user and the collaborative authenticator themselves) are within some distance of one another (e.g., 5 feet, 20 feet, 100 feet, in the same building, etc.). Such co-location could also be performed by other techniques as well, such as by GPS or the like. In other cases, the collaborative authenticator and user to be authenticated are not co-located.

An authentication response may be received at step 270 from the collaborative authenticator (e.g., through the application or interface being accessed by the collaborative authenticator) or user being authenticated. This authentication response may be a simple yes/no authentication by the collaborative authenticator, or may include the user's response to authentication questions (e.g., mother's maiden name, employee ID, etc.) such that the data can be verified against data associated with the device.

Based on the authentication response provided by the collaborative authenticator (and possibly the additional data provided by the collaborative authenticator or user being authenticated), an authentication notification response may be provided to the user who is being authenticated at step 280. Providing the notification may be providing the user with requested data, providing the user with access for a limited amount of time, allowing a requested access, denying a requested access (e.g., denying access to content), disabling the computing device of the user, sending an e-mail, generating a security alert to a security office (e.g., a security office associated with a system such as platform 120 of FIG. 1), or taking a wide variety of other actions.

Figure 3:
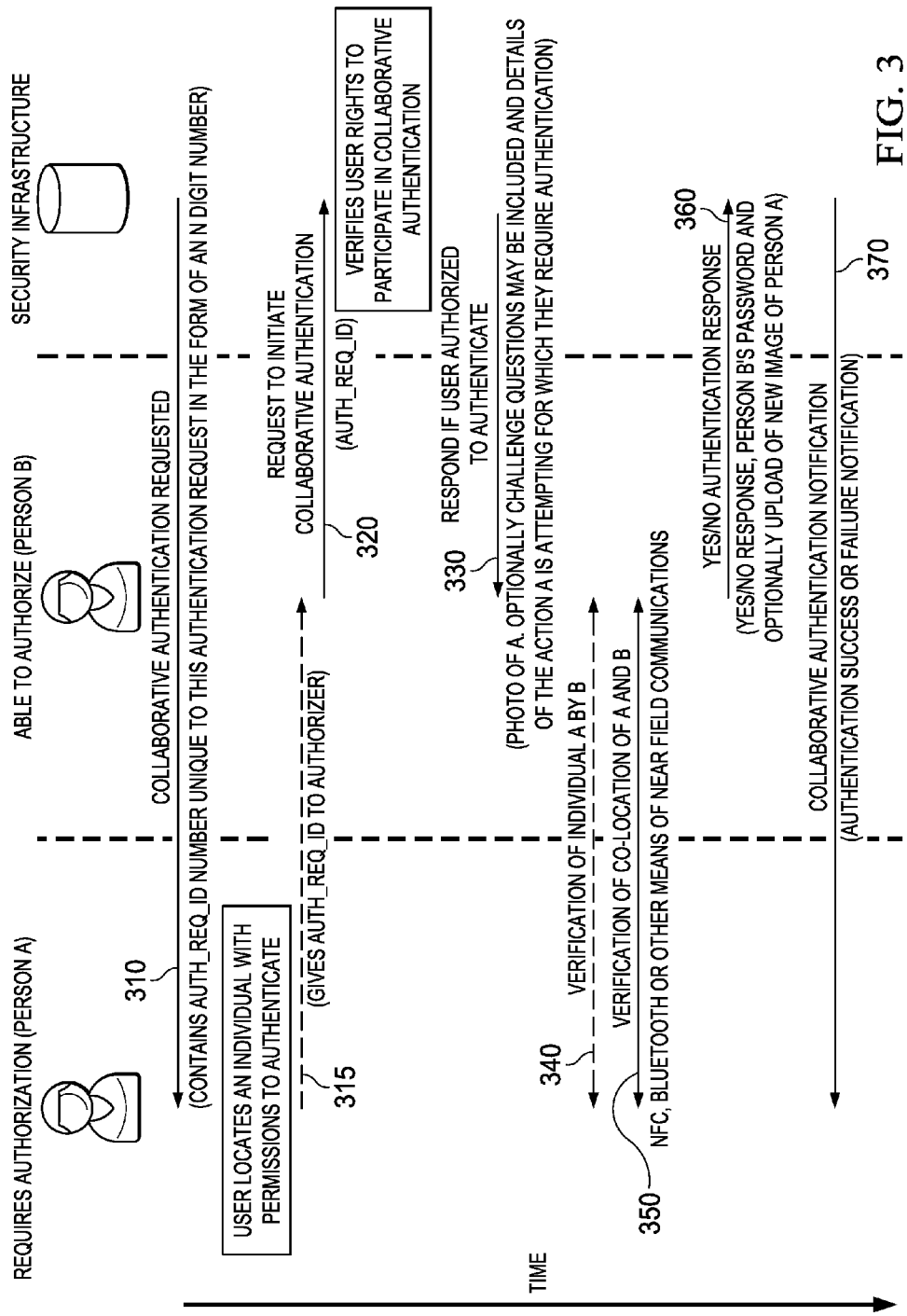
FIG. 3 is a flow diagram of one example of collaborative authentication.

Moving on to FIG. 3, one example of a collaborative authentication scenario is depicted. In the example depicted, a collaborative authentication may be initiated by a security system and at step 310 a collaborative authentication request may be sent to a user (here Person A). Such a request may present a message to the user that a collaborative authentication has been initiated and that he should locate a collaborative authenticator. Furthermore, the request may include an authentication identifier (e.g., AUTH_REQ_ID). Additionally, in one embodiment, an identity of a collaborative authenticator (e.g., by name, title, role, group) to utilize (e.g., person B) may be provided in the collaborative authentication request sent to the user along with a location of the collaborative authenticator if it is available. The security system may determine the collaborative authenticator based on any algorithm or criteria desired, including data associated with prospective collaborative authenticators. For example, in some embodiments it may be desired to select a collaborative authenticator who has a relatively high security level, is in a different department than the user, but is in relatively close physical proximity to the user.

The user may then locate a collaborative authenticator (here, Person B) and provide the collaborative authenticator the authentication identifier at step 315. For example, if the collaborative authentication request does not specify the identity of a collaborative authenticator the user may locate someone who he wishes to user as a collaborative authenticator while if a collaborative authenticator has been provided in the collaborative authentication request the user may use the location information associated with the provided collaborative authenticator to locate the provided collaborative authenticator. The collaborative authenticator may provide this authentication identifier to the security system at step 320.

Next, at step 330, the collaborative authenticator may be provided with authentication data. This authentication data may include a challenge mechanism such as a photograph of the user by which the collaborative authenticator may authenticate the user, one or more questions for a collaborative authenticator to pose to the user (e.g., personal and private information, such as what is your mother's maiden name; employment information, such as what is your desk number, employee id number, etc.; or other information).

Additionally, this authentication data may include reminders to the collaborative authenticator of the consequences (e.g., to himself or the company) or the implications of falsely authenticating the user, or additional information about why collaborative authentication of the user is being performed (e.g., attempted accesses or actions by the user). This would alert the collaborative authenticator to the user's actions (e.g., "the user is attempting to wipe all content from the system") and thereby highlight the consequences of such an authentication process.

The collaborative authenticator may communicate with the user using the challenge mechanism at step 340 (e.g., compare the received photo to the user, ask the user the question(s), tell the user a code, etc.). The co-location of the user and the collaborative authenticator may be verified at step 350 to ensure that they are within some distance of one another as the authentication process is being performed.

An authentication response may be received at the security system at step 360 from the collaborative authenticator. For example, the collaborative authenticator may ask the user to provide the user's mother's maiden name. The user does not tell the collaborative authenticator the answer, but instead enters the information into a text box, e-mail, or other secure communication for sending to the security system (e.g., security module 128 of FIG. 1). This authentication response may be a simple yes/no authentication by the collaborative authenticator, or may include the user's response to authentication questions (e.g., mother's maiden name, employee ID, etc.) such that it can be verified against data associated with the device. The collaborative authenticator may be instructed to ask several questions as a group such that the user has to answer all questions posed by the collaborative authenticator in a single communication to security module 128, or the collaborative authenticator may ask questions or challenges such that the user has to respond to each question individually until security module 128 either authenticates the user or determines the user should not have access.

A concern for a collaborative authenticator may be the user possibly confronting him/her in the event the collaborative authenticator is unwilling to participate in the authentication process. To overcome this concern, embodiments may allow a collaborative authenticator to deny access to the user without the user's knowledge. In some embodiments, the collaborative authenticator may be provided with an opportunity to respond directly to security module 128 to deny the user from being authenticated. For example, a button or icon may be presented to the collaborative authenticator saying "Deny access." In this scenario, the collaborative authenticator can perform the steps to authenticate the user (e.g., asking the user to provide a mother's maiden name, verifying the last four numbers of a SSN, etc.) as if he/she is collaboratively authenticating the user, but can click the button or icon to prevent the user from accessing the documents. In this way, the collaborative authenticator is able to secretly deny access by the user and without fear of reprisal by the user because the collaborative authenticator is still able to perform the duties that the user is expecting the collaborative authenticator to perform, but is able to communicate with the security system directly to deny access by the user. The user may be informed that access was denied, but may not provide information as to why the access was denied.

Based on the authentication response provided by the collaborative authenticator (and possibly the additional data provided by the collaborative authenticator or user being authenticated), an authentication notification response may be provided to the user who is being authenticated at step 370. Providing the notification may include providing the user with requested data, allowing a requested access, allowing requested access for a limited time, temporarily elevating the user's security access, denying a requested access, disabling the computing device of the user, sending an e-mail, generating a security alert to a security office (e.g., a security office associated with a system such as platform 120 of FIG. 1), or taking a wide variety of other actions.

In certain embodiments, the collaborative authenticator may include multiple collaborative authenticators. Specifically, in one embodiment, a first collaborative authenticator may control or mediate the collaborative authentication between the user and a second collaborative authenticator. In such embodiments the second collaborative authenticator may be yet another check in the process and could further thwart the user's attempt to use a collaborative authenticator who is fraudulent. With additional collaborative authenticators added to the process the likelihood of any type of fraud in the collaborative authentication process can be further reduced.

More particularly, in certain embodiments, the authentication request and identifier may be provided to a first collaborative authenticator who locates the user to be verified. The user may then indicate to the first collaborative authenticator that they wish to be authenticated by a second collaborative authenticator. The first collaborative authenticator may then provide the authentication identifier along with an identification of the second collaborative authenticator (or the second authenticator's device). The authentication data can then be provided to the second collaborative authenticator (e.g., at their computing device). The first collaborative authenticator may then authenticate (or fail to authenticate) the user. Additionally, in some embodiments, the physical proximity (also referred to as co-location) of the second collaborative authenticator and the user may be verified, for example, by the first collaborative authenticator. An authentication notification response may then be provided to the user who is being authenticated as discussed above.

Figure 4:
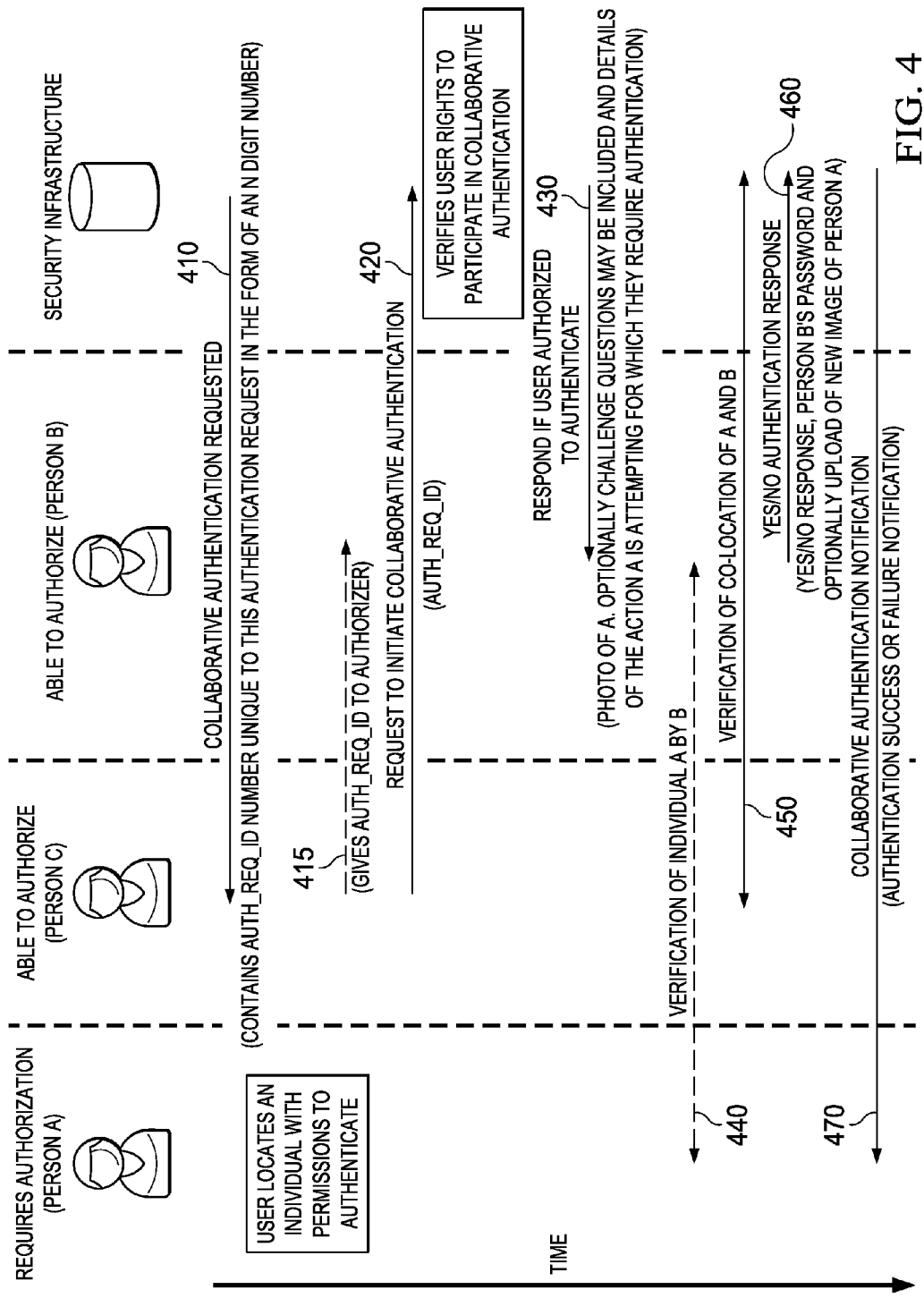
FIG. 4 is a flow diagram of one example of collaborative authentication.

FIG. 4 depicts an example of a collaborative authentication scenario utilizing two collaborative authenticators. In the example depicted, a collaborative authentication may be initiated by a security system and, at step 410, a collaborative authentication request may be sent to a first collaborative authenticator (here Person C and who may also be referred to as a mediator user). Such a request may present a message that a collaborative authentication has been initiated for a user (here person A and who may also be referred to as a candidate user). Furthermore, the request may include an authentication identifier (e.g., AUTH_REQ_ID).

The user may inform the first collaborative authenticator (Person C) that he desires a particular person to be used as his collaborative authenticator. The first collaborative authenticator (Person C) may then locate this second collaborative authenticator (here, Person B and who may also be referred to as an authenticating user) specified by the user and provide the second collaborative authenticator the authentication identifier at step 415.

Alternatively, in one embodiment, the identity of a second collaborative authenticator to utilize (here, Person B) may be provided in the collaborative authentication request sent to the first collaborative authenticator (here, Person C) along with a location of the second collaborative authenticator if it is available, or information on how to communicate with the second collaborative (e.g., via video chat or other mechanism that provides a high degree of certainty that Person C is communicating with Person B). Thus, when a collaborative authentication is performed the user and the first collaborative authenticator (Person C) may locate the second collaborative authenticator (here, Person B) whose identity was provided to the first collaborative authenticator (Person C), and the first collaborative authenticator (Person C) will provide the second collaborative authenticator the authentication identifier at step 415.

Either the first or the second collaborative authenticator may then initiate the authentication through their device at step 420. The first collaborative authenticator (Person C) may then provide this authentication identifier to the security system using their computing device. Additionally, the first collaborative authenticator (Person C) may identify the second collaborative authenticator (Person B).

Next, at step 430, the second collaborative authenticator may be provided with authentication data. This authentication data may include a challenge mechanism such as a photograph of the user by which the collaborative authenticator may authenticate the user, one or more questions for a collaborative authenticator to pose to the user (e.g., what is your mother's maiden name, what is your desk number of employee id number, etc.).

The second collaborative authenticator (Person B) may authenticate the user using the challenge mechanism at step 440 (e.g., compare the received photo to the user, ask the user the question(s) and receive the answers, etc.). In some embodiments, co-location of the user and the collaborative authenticator may be verified, at step 450, to ensure that they are within some distance of one another as the authentication process is being performed. This verification may, in some embodiments, be performed by the first collaborative authenticator (Person C) who can verify the co-location to the security system, for example, through his device.

According to one embodiment, the security system may send a request to the first collaborative authenticator to verify co-location of the candidate user and the second collaborative authenticator. The first collaborative authenticator can send a response verifying co-location of the candidate user and the second collaborative authenticator. In other cases, the request may be sent to the second collaborative authenticator or user and the response received from the second collaborative authenticator or user.

An authentication response may be received at the security system, at step 460, from the second collaborative authenticator (Person B). Based on the authentication response provided by the second collaborative authenticator (and possibly additional data provided the first collaborative authenticator) an authentication notification response may be provided to the user who is being authenticated at step 470. Such a notification may be providing the user with requested data, allowing a requested access, allowing requested access for a limited time, denying a requested access, disabling the computing device of the user, an e-mail, generation of a security alert to a security officer, or a wide variety of other actions.

Thus, here, the first collaborative authenticator (Person C) controls/mediates the authentication between the user (Person A) and the second collaborative authenticator (Person B). This person is yet another check in the process and could further thwart Person A attempting to use a fraudulent Person B authentication partner. Such a scenario may be especially useful in, for example, a transaction at a retail store or at a security gate.

Figure 5:
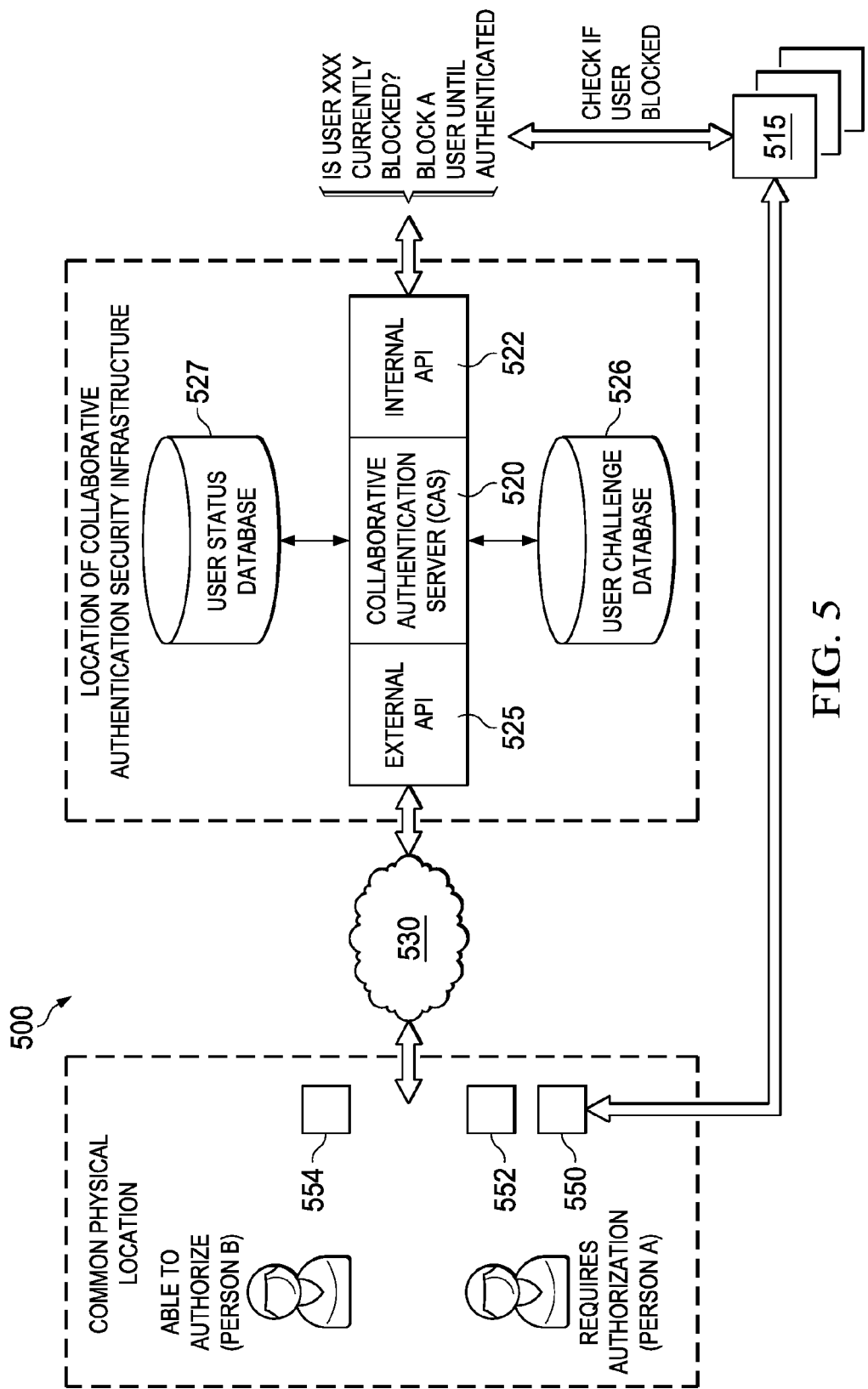
FIG. 5 is a block diagram illustrating one embodiment of a collaborative authentication system.
Figure 6:
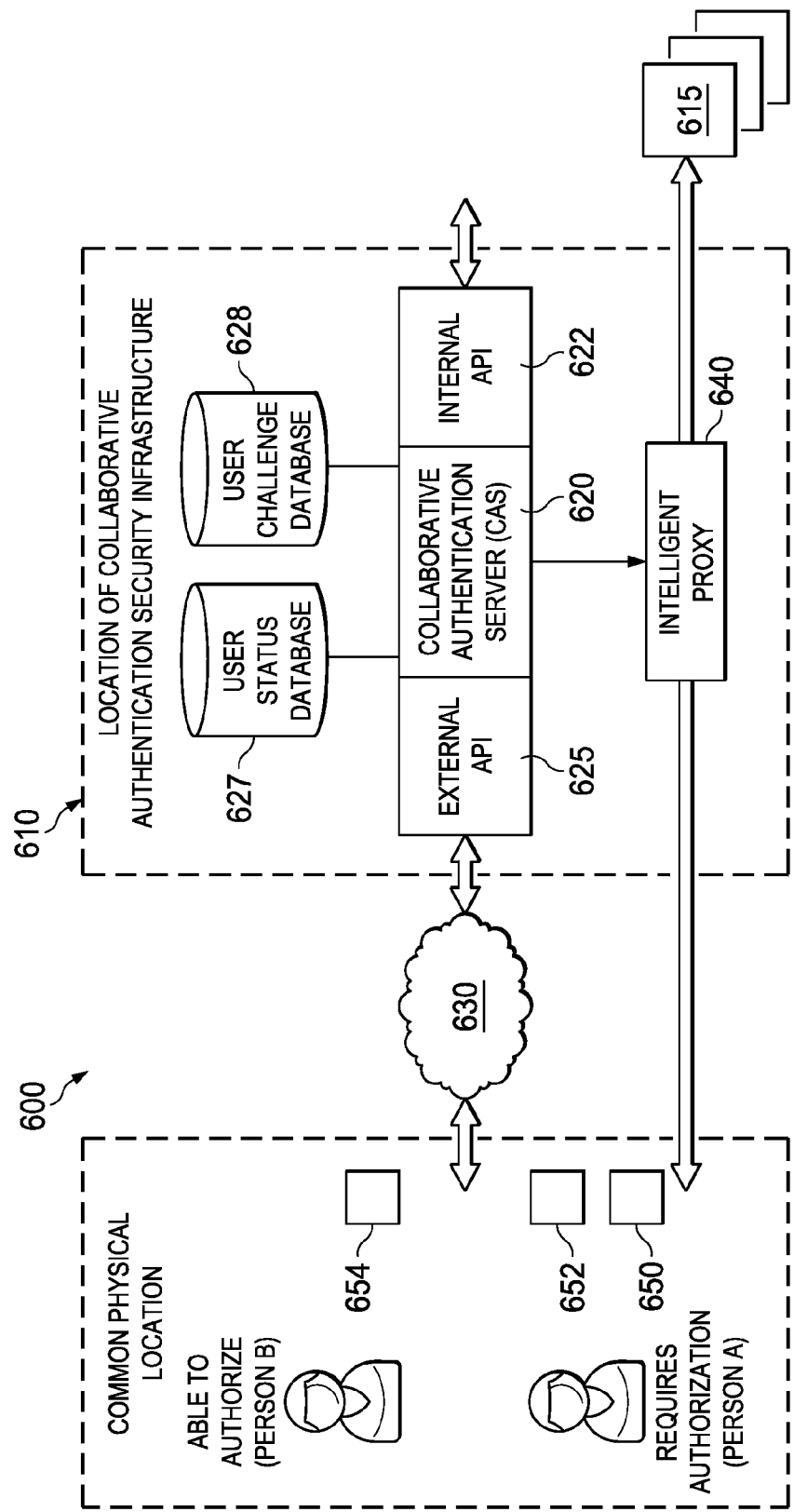
FIG. 6 is a block diagram illustrating one embodiment of a collaborative authentication system.

FIGS. 5 and 6 are block diagrams illustrating embodiments of a system for collaborative authentication. To maintain security, as soon as a security system recognizes that a person needs authentication, the system must prevent a person from just accessing documents or back end services. Security may be built into the software, or all communications can go through a proxy server, or all applications may check with a security system before sending data.

FIG. 5 depicts one embodiment of a system for collaborative authentication 500 collaborative authentication security infrastructure 510 that allows or blocks access by a user (here Person A) to backend systems 515. Collaborative authentication security infrastructure 510 and backend systems 515 may communicate with applications at user computing devices and each other via one or more networks 530. At a high level, applications provided by backend systems 540 may check with collaborative authentication security infrastructure 510 prior to sending any information to the requesting user. An application does not need to know why a requester is blocked, or whether the requester is requesting authentication, etc. In some embodiments, a policy may be implemented that applications must check with collaborative authentication security infrastructure 510 prior to sending information to a third party requester.

Collaborative authentication security infrastructure 510 can include one or more computing devices executing a collaborative authentication application to provide a collaborative authentication server (CAS) 520, which is one example of a security module (e.g., security module 128 of FIG. 1). CAS 520 can provide a first interface 522, such an API, to allow applications on backend systems 515 to communicate with CAS 520 and a second interface 525, such as an API, to allow applications on user computing devices to communicate with CAS 520. CAS 520 may further maintain a user status database 527 recording whether individual users (or groups, roles, or other classification of users) are blocked from or allowed to access particular applications, data or other aspects of backend systems 515. CAS 520 may further maintain a user challenge database 526 containing information used in collaborative authentication such as challenge questions, identity of collaborative authenticators or other information. While illustrated separately, user challenge database 526 and user status database 527 may be portions of the same database.

Backend system 515 comprise one or more computing devices executing applications to provide data to users including, but not limited to files, records, objects and other data. Backend systems 515 may share hardware with CAS 520 or may be separate systems and may act as one example of content provisioning modules (e.g., content provisioning modules 122 of FIG. 1).

In operation, a user may use an application 550 to access data from applications of a backend system 515. The backend system 515 can communicate data with application 550 until the backend system 515 determines that the user is blocked. The backend systems 515 that provides data to a user's application 550 checks via first interface 522 whether the person (here Person A) is blocked. CAS 520 checks user status database 527 and alert the requesting backend system 515 if the user is blocked.

If the user is currently blocked, the backend system 515 will prevent access by the user and may communicate a message to the user (e.g., an error message). The blocked user may request collaborative authentication from CAS 520 or CAS 520 may initiate a collaborative authentication process based on a status request from backend system 515. CAS 520 may provide the identity of a collaborative authenticator to the user requesting authentication (here person A), provide challenge information to a collaborative authenticator (here person B), receive responses and authenticate the user (here Person A) or maintain the user's status as blocked. When the user does not have a blocked status, the backend system 515 may communicate requested data to the user.

In one embodiment, if a user (here Person A) begins a collaborative authentication process, his/her username is captured through user entry or from existing information on the user's computing device. The user's username is sent to interface 525 of CAS 520 by authentication application 552, which may be a portion of or be separate from application 550 used to request data from backend systems 515. CAS 520 checks the status of the user in user status database 527. If the user is not blocked, the user may be asked if they wish to authenticate another user. If the user is blocked, then an authentication session code is returned to the user's authentication application 552. In some cases the identity of a collaborative authenticator (here Person B) is also provided. The collaborative authenticator starts his/her authentication application 554. The collaborative authenticator is asked if they wish to authenticate another user. If so, the collaborative authenticator may enter the authentication session code and collaborative authentication may take place.

By way of example, but not limitation, a picture of the requesting user (Person A) may be provided to the collaborative authenticator's authentication application 554 to allow the collaborative authenticator to confirm the identity of the requesting user. Various questions may also be passed to the collaborative authenticator's authentication application 554 (e.g., what is your zip code, what is your mother's maiden name, etc.). The requesting user (here Person A) may respond to the questions by entering the answers through authentication application 552 (or, in some embodiments, authentication application 554). Thus, in some embodiments, the user being authenticated may use their own device to provide personal information in response to questions sent to the collaborative authenticator's device. CAS 520 may also verify co-location of a user to be authenticated and a collaborative authenticator.

If the user is authenticated, the user may remain unblocked during a session with the backend system 515, for a specified period of time that may span multiple sessions, until the occurrence of a specified event or for another period. By way of example, but not limitation, a user may require authentication every month, based on the user's activities (e.g., downloading more than x documents in y time) or other criteria.

While only one level of collaborative authentication is shown, there may be multiple tiers of authentication (e.g., as discussed above in conjunction with FIG. 4).

FIG. 6 depicts one embodiment of a system for collaborative authentication 600 comprising a collaborative authentication security infrastructure 610 that allows or blocks access by a user (here Person A) to backend systems 615. Collaborative authentication security infrastructure 610 and backend systems 615 may communicate with applications at user computing devices and each other via one or more networks 630.

Collaborative authentication security infrastructure 610 can include one or more computing devices executing a collaborative authentication application to provide a collaborative authentication server (CAS) 620 and one or more computing devices executing a proxy server application to provide proxy server 640. CAS 620 and proxy server 640 may be located on the same server or may be distributed among multiple servers. CAS 620 can be one example of a security module (e.g., security module 128 of FIG. 1).

CAS 620 can provide a first interface 622, such an API, to allow proxy server 640 to communicate with CAS 520 and a second interface 625, such as an API, to allow applications on user computing devices to communicate with CAS 620. CAS 620 may further maintain a user status database 627 recording whether individual users (or groups, roles, or other classification of users) are blocked from or allowed to access particular applications, data or other aspects of backend systems 615. CAS 620 may further maintain a user challenge database 628 containing information used in collaborative authentication such as challenge questions, identity of collaborative authenticators or other information. While illustrated separately, user challenge database 628 and user status database 627 may be portions of the same database.

Backend systems 615 comprise one or more computing devices executing applications to provide data to users including, but not limited to files, records, objects and other data. Backend systems 615 may share hardware with CAS 620 or proxy server 640 or may be separate systems and may act as one example of content provisioning modules (e.g., content provisioning modules 122 of FIG. 1).

In operation, communications between applications on user computing devices and back end system 615 may be routed through proxy server 640. When proxy server 640 determines that a user is communicating with a backend system 615, proxy server 640 may query CAS 620 for the status of the user. If the user is currently blocked from accessing the backend system 615, proxy server 640 may prevent the user from communicating with backend system 615, return an error or take another action. If the user is not currently blocked, proxy server 640 may allow communication between the user and the backend system 615.

The blocked user may request collaborative authentication from CAS 620 or CAS 620 may initiate a collaborative authentication process based on a status request from backend system 615. CAS 620 may provide the identity of a collaborative authenticator to the user requesting authentication (here person A), provide challenge information to a collaborative authenticator (here person B), receive responses and authenticate the user (here Person A) or maintain the user's status as blocked. If the user is authenticated, the user may remain unblocked during a session with the backend system 615, for a specified period of time that may span multiple sessions, until the occurrence of a specified event or for another period.

In one embodiment, if a user (here Person A) begins a collaborative authentication process, his/her username is captured through user entry or from existing information on the user's computing device. The user's username is sent to interface 625 of CAS 620 by user authentication application 652, which may be a portion of or be separate from application 650 used to request data from backend systems 615. CAS 620 checks the status of the user in user status database 627. If the user is not blocked, the user may be asked if they wish to authenticate another user. If the user is blocked, then an authentication session code is returned to the user's authentication application 652. In some cases the identity of a collaborative authenticator (here Person B) is also provided. The collaborative authenticator starts his/her authentication application 654. The collaborative authenticator is asked if they wish to authenticate another user. If so, the collaborative authenticator may enter the authentication session code and collaborative authentication may take place.

By way of example, but not limitation, a picture of the requesting user (Person A) may be provided to the collaborative authenticator's authentication application 654 to allow the collaborative authenticator to confirm the identity of the requesting user. Various questions may also be passed to the collaborative authenticator's authentication application 654 (e.g., what is your zip code, what is your mother's maiden name, etc.). The requesting user (here Person A) may respond to the questions by entering the answers through authentication application 652 (or, in some embodiments, authentication application 654). Thus, in some embodiments, the user being authenticated may use their own device to provide personal information in response to questions sent to the collaborative authenticator's device. CAS 520 may also verify co-location of a user to be authenticated and a collaborative authenticator.

If the user is authenticated, the user may remain unblocked during a session with the backend system 615, for a specified period of time that may span multiple sessions, until the occurrence of a specified event or for another period. By way of example, but not limitation, a user may require authentication every month, based on the user's activities (e.g., downloading more than x documents in y time) or other criteria.

While only one level of collaborative authentication is shown, there may be multiple tiers of authentication (e.g., as discussed above in conjunction with FIG. 4).

Figure 7:
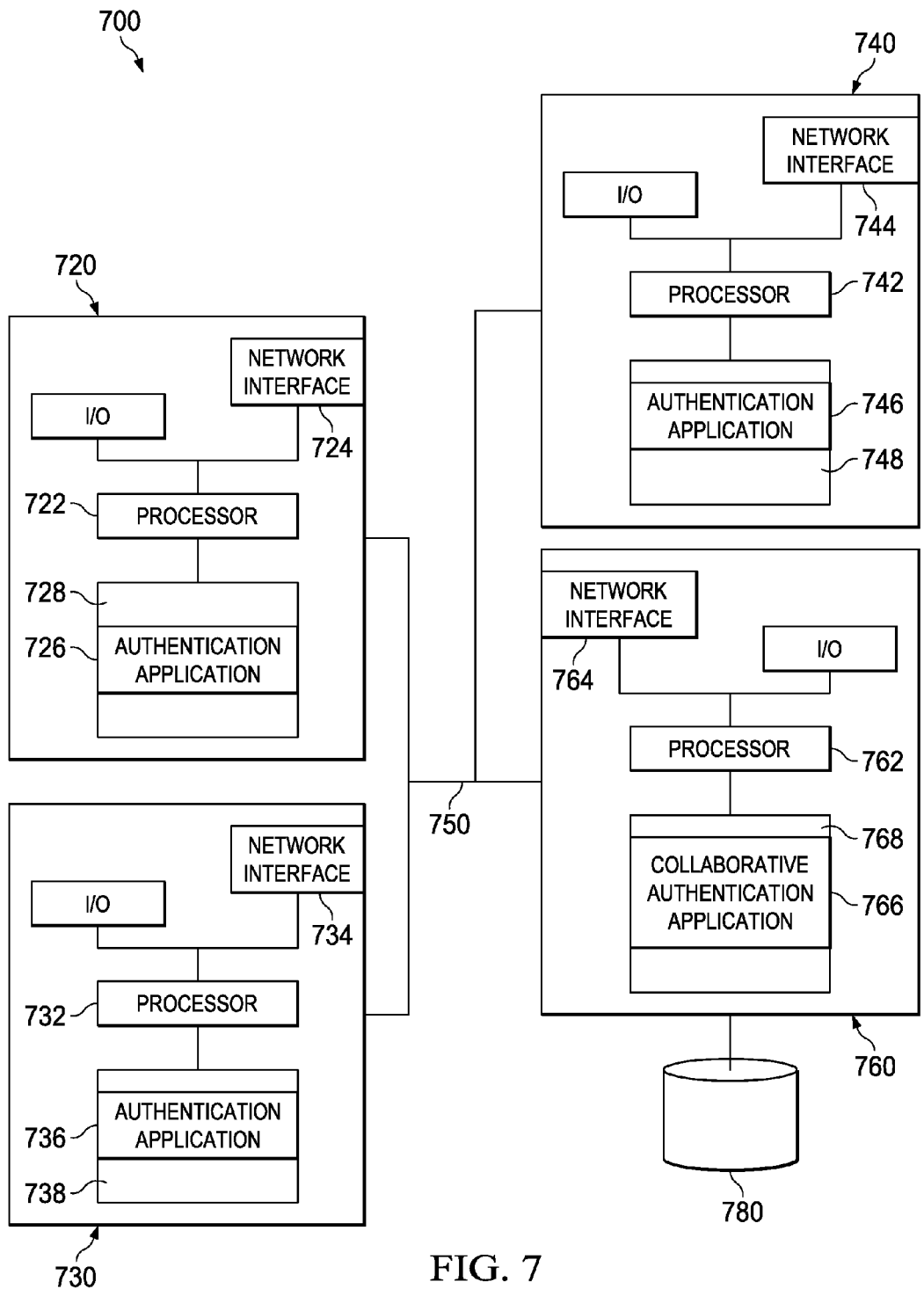
FIG. 7 is a diagrammatic representation of one embodiment of a collaborative authentication system that includes user computing devices and one or more server machines.

FIG. 7 is a diagrammatic representation of one embodiment of a system 700 that includes user computing devices 720, 730 and 740 and one or more server machines such as server machine 760. As illustrated in FIG. 7, client computing devices 720, 730, and 740 and server machine 760 can be connected via standard transmission channel 750, which may be a wired and/or wireless network including a local area network (LAN), wide area network (WAN), the Internet, or other wired and/or wireless network.

Client computing devices 720, 730 and 740 in system 700 can be a computing device including a central processing unit ("CPU") (e.g., CPU 722, CPU 732, and CPU 742), a network connection device (e.g., network interface 724, network interface 734, and network interface 744), and a non-transitory computer readable medium (e.g., computer readable medium 728, computer readable medium 738, and computer readable medium 748), each of which can comprise any combination of a primary memory, a secondary memory, a random access memory (RAM), a read only memory (ROM), and/or a magnetic storage device such as a hard drive (HD) or other non-transitory computer readable storage medium. Each computer readable medium (e.g., computer readable medium 728, computer readable medium 738, and computer readable medium 748) may store a number of computer programs. In particular, each computer readable medium can store a user authentication application (e.g., authentication application 726, authentication application 736, and authentication application 746). Each authentication application may be a stand-alone application, a portion of an application or a web browser or other application capable of communicating with a server to participate in collaborative authentication. As known to those in the art, a browser application can be used to communicate with remote server computers such as server machine 760 and to visually present the information received from server machine 760. Each user computing device can establish network communications through transmission channel 750.

Server 760 can include a plurality of server computer components, including a processor 762, a network connection device 764, and a non-transitory computer readable medium 768. Computer readable medium 768 can comprise any combination of a primary memory, a secondary memory, a RAM, a ROM, and/or a magnetic storage device such as a HD or other non-transitory computer readable storage medium. Computer readable medium 768 may store a number of computer programs. As shown in FIG. 7, server 760 stores collaborative authentication server application 766 for servicing requests from user devices such as client computing devices 720, 730, and 740 over transmission channel 750. Server 760 can also act as a content provisioning system that provides content to user computing devices.

Through execution of collaborative authentication application 766, server 760 may provide a security module (e.g., security module 128 of FIG. 1) to participate in collaborative authentication with users and one or more collaborative authenticators. Accordingly, collaborative authentication application 766 may access one or more databases 780 of user information, status information, trigger data or other information. In some embodiments, server 760 may act as one or more of CAS 520 (FIG. 5) that services status requests from applications running on server 760 or other systems, CAS 620 (FIG. 6) that provides or cooperates with a proxy server to control access to applications or other collaborative authentication server. Server 760 may also act as one or more of a proxy server (e.g., proxy server 640 or other proxy server), backend system (e.g., backend system 515, backend system 615 or other backend system or content provisioning system) or other server or system.

While the above embodiments have been discussed primarily in terms of computing devices that provide information through displays, other embodiments may be established using audio messages. There may be areas or regions in which it is uncommon for people to carry smartphones, tablets, or similar devices. In some embodiments, a security system may assign a person as a collaborative authenticator, communication may be handled using standard telephone exchanges, etc., with the collaborative authenticator having knowledge of the requester or the documents being requested. The collaborative authenticator and user may receive messages from the security system and provide answers via phone.

Routines, methods, steps, operations or portions thereof described herein can be implemented through control logic, including computer executable instructions stored on a computer readable medium, hardware, firmware or a combination thereof. The control logic can be adapted to direct an information processing device to perform a set of steps disclosed in the various embodiments. Some embodiments may be implemented by processors executing software programming or code in one or more digital computers, by using application specific integrated circuits, programmable logic devices, field programmable gate arrays, optical, chemical, biological, quantum or nanoengineered systems, components and mechanisms. Based on the disclosure and teachings provided herein, a person of ordinary skill in the art will appreciate other ways and/or methods to implement the invention.

Computer executable instructions or code can be stored in a computer-readable medium and can be operated on by a processor to permit a computer to perform functions, steps, operations, methods, routines, operations or portions thereof described herein. Any suitable language or scripting code can be used. Different programming techniques can be employed such as procedural or object oriented.

Any particular step, operation, method, routine, operation or portion thereof can execute on a single computer processing device or multiple computer processing devices, a single computer processor or multiple computer processors. Data may be stored in a single storage medium or distributed through multiple storage mediums, and may reside in a single database or multiple databases (or other data storage). The sequence of operations described herein can be interrupted, suspended, or otherwise controlled by another process, such as an operating system, kernel, etc. The routines can operate in an operating system environment or as stand-alone routines.

A "computer-readable medium" may be any type of non-transitory data storage medium that can store computer instructions, including, but not limited to read-only memory (ROM), random access memory (RAM), hard disks (HD), data cartridges, data backup magnetic tapes, floppy diskettes, flash memory, optical data storage, CD-ROMs, or the like. The computer readable medium can be, by way of example only, but not by limitation, an electronic, magnetic, optical, electromagnetic, infrared, or semiconductor system, apparatus, system, device, or computer memory. The computer readable medium may include multiple computer readable media storing computer executable instructions, such as in a distributed system or instructions stored across an array.

A "processor" includes any hardware system, hardware mechanism or hardware component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will be understood for purposes of this disclosure that a service or module is one or more computer devices, configured (e.g., by a computer process or hardware) to perform one or more functions. In some cases, one or more interfaces can be utilized to access these functions. Such interfaces include APIs, interfaces presented for a web services, web pages, remote procedure calls, remote method invocation, etc.

Embodiments can be implemented in a computer communicatively coupled to a network (for example, the Internet, an intranet, an internet, a WAN, a LAN, a SAN, etc.), another computer, or in a stand-alone computer. As is known to those skilled in the art, the computer can include processor, such as a central processing unit ("CPU"), memory (e.g., primary or secondary memory such as RAM, ROM, HD or other computer readable medium for the persistent or temporary storage of instructions and data) and one or more input/output ("I/O") device(s). The I/O devices can include a keyboard, monitor, printer, electronic pointing device (for example, mouse, trackball, stylus, etc.), touch screen or the like. In embodiments, the computer has access to at least one database or other data storage on the same hardware or over the network.

Steps, operations, methods, routines or portions thereof of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with network and other communications protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention.

What is claimed is:

1. A method for collaborative authentication, comprising:
    sending from a server to a collaborative authentication participant an authentication identifier associated with a user at a first computing device;
    receiving a message at the server from a collaborative authenticator, the message including the authentication identifier, wherein the authentication identifier was provided from the collaborative authentication participant to the collaborative authenticator;
    determining authentication data based on information associated with the user stored in a database;
    sending the authentication data from the server to a second computing device based on receiving the message, the authentication data comprising a challenge relating to the user at the first computing device;
    receiving an authentication response at the server, the authentication response comprising a response to the challenge, wherein the response to the challenge was determined from an interaction between the collaborative authenticator and the collaborative authentication participant: and providing an authentication notification to the user based on the authentication response.

2. The method of claim 1, further comprising verifying co location of the first computing device and the second computing device.

3. The method of claim 1, wherein providing the authentication notification comprises providing the user with access to data requested by the user.

4. The method of claim 1, wherein the challenge comprises a digital picture of the user and the response to the challenge comprises a verification of identity by the collaborative authenticator.

5. The method of claim 1, wherein the challenge comprises a predetermined question and the response to the challenge comprises an answer to the predetermined question.

6. The method of claim 5, wherein receiving the authentication response comprises receiving the answer to the predetermined question from the first computing device.

7. The method of claim 6, wherein providing the authentication notification to the user based on the authentication response comprises comparing the answer to the predetermined question received from the first computing device to a stored answer and determining the authentication notification based on a result of the comparison.

8. The method of claim 1, further comprising:
receiving, at the server, a status check from a data provisioning system, the status check requesting the status of the user; and
providing, by the server, a status to the data provisioning system indicating if the user is blocked from receiving data from the system.

9. The method of claim 1, further comprising:
intercepting a request associated with the user to a back-end system;
determining a status of the user; and
in response to determining the status of the user, blocking the request.

10. The method of claim 1, wherein:
receiving the message including the authentication identifier from the collaborative authenticator comprises receiving the authentication identifier from a first collaborative authenticator at a third computing device; and
sending authentication data to the second computing device comprises sending the authentication data to a second collaborative authenticator.

11. The method of claim 1, wherein sending the authentication identifier to the collaborative authentication participant comprises sending the authentication identifier to the user at the first computing device.

12. The method of claim 1, wherein the interaction is an interaction between devices.

13. A collaborative authentication system, comprising:
a processor;
a non-transitory computer readable medium accessible by the processor and storing a set of computer instructions executable by the processor to perform a method comprising:
generating an authentication identifier associated with a user at a first computing device;
sending the authentication identifier to a collaborative authentication participant;
receiving a message including the authentication identifier from a collaborative authenticator, wherein the authentication identifier was provided from the collaborative authentication participant to the collaborative authenticator;
determining authentication data based on information associated with the user stored in a database;
sending the authentication data to a second computing device based on the message including the authentication identifier, the authentication data comprising a challenge relating to the user at the first computing, device;
receiving an authentication response, the authentication response comprising a response to the challenge, wherein the response to the challenge was determined from an interaction between the collaborative authenticator and the collaborative authentication participant: and
providing an authentication notification to the user based on the authentication response.

14. The system of claim 13, wherein the method further comprises verifying co-location of the first computing device and the second computing device.

15. The system of claim 13, wherein providing the authentication notification comprises providing the user with access to data requested by the user.

16. The system of claim 13, wherein the challenge comprises a digital picture of the user and the response to the challenge comprises a verification of identity by the collaborative authenticator.

17. The system of claim 13, wherein the challenge comprises a predetermined question and the response to the challenge comprises an answer to the predetermined question.

18. The system of claim 17, wherein receiving the authentication response comprises receiving the answer to the predetermined question from the first computing device.

19. The system of claim 17, wherein providing the authentication notification to the user based on the authentication response comprises comparing the answer to the predetermined question received from the first computing device to a stored answer and determining the authentication notification based on a result of the comparison.

20. The system of claim 13, wherein the method further comprises:
receiving a status check from a system that provides data to users, the status check requesting the status of the user; and
responding to the status check with a status indicating if the user is blocked from receiving data from the system.

21. The system of claim 13, wherein the method further comprises:
intercepting a request from the first computing device to a system that provides data to users;
determining a status of the user; and
in response to determining the status of the user, blocking the request.

22. The system of claim 13, wherein:
receiving the message including the authentication identifier from the collaborative authenticator comprises receiving the authentication identifier from a first collaborative authenticator at a third computing device; and
sending authentication data to the second computing device comprises providing the authentication data to a second collaborative authenticator.

23. The system of claim 13, wherein sending the authentication identifier to the collaborative authentication participant comprises sending the authentication identifier to the first computing device.

24. The system of claim 13, wherein the interaction is an interaction between devices.

25. A method of collaborative authentication comprising:
at a security module executing on a first server computer,
generating an authentication identifier associated with a candidate user requiring authentication;
sending, from the security module on the first server computer, said authentication identifier to a collaborative authentication participant;
receiving, at the security module on the first server computer, the authentication identifier associated with the candidate user from an authenticating user at a second computer, wherein the authentication identifier was provided from the collaborative authentication participant to the authenticating user;
determining, at the security module on the first server computer, authentication information based on information associated with the candidate user stored in a database;
sending the authentication information to the authenticating user at the second computer, said authentication information comprising a challenge related to the candidate user;
receiving a response comprising a response to the challenge, wherein the response to the challenge was determined from an interaction between the authenticating user and the collaborative authentication participant; and
based on said response to the challenge, determining whether to authenticate the candidate user.

26. The method of claim 25, wherein the candidate user selects the authenticating user.

27. The method of claim 25, wherein sending said authentication identifier to the candidate user comprises:
sending an instruction to the candidate user instructing the candidate user to select the authenticating user.

28. The method of claim 25, wherein said security module provides the candidate user with criteria associated with the authenticating user.

29. The method of claim 25, wherein said authentication information includes at least one of: a photograph of the candidate user, personal and private information of the candidate user, or employment information associated with the candidate user.

30. The method of claim 25, wherein said response to the challenge is received from the authenticating user, the authenticating user basing said response to the challenge on communications with the candidate user regarding said challenge.

31. The method of claim 25, wherein the authenticating user provides the challenge to the candidate user and said response to the challenge is received from the candidate user.

32. The method of claim 25, wherein said challenge comprises a predetermined security question associated with the candidate user, said predetermined security question related to personal and private information of the candidate user and corresponding to a stored answer to the predetermined security question previously provided by the candidate user.

33. The method of claim 25, wherein said determining whether to authenticate the candidate user includes comparing said response to the challenge to a stored answer to the challenge, the stored answer previously provided by the candidate user.

34. The method of claim 25, further comprising:
at the security module, verifying that the authenticating user can participate in authentication.

35. The method of claim 25, further comprising:
verifying co-location of the candidate user and the authenticating user, wherein said determining whether to authenticate the candidate user is further based on said verifying co-location of the candidate user and the authenticating user.

36. The method of claim 35, wherein said verifying co-location of the candidate user and the authenticating user comprises comparing the location information of the candidate user and the location information of the authenticating user.

37. The method of claim 36, wherein said verifying co-location of the candidate user and the authenticating user comprises receiving a response from the authenticating user verifying co location of the candidate user and the authenticating user.

38. The method of claim 25, wherein said authenticating user includes a plurality of authenticating users including a mediator user and a selected authenticating user, wherein said authentication information is sent to the selected authenticating user and said response to the challenge is received from the selected authenticating user, further comprising verifying co-location of the candidate user and the selected authenticating user.

39. The method of claim 38, wherein said authentication identifier associated with the candidate user is sent by the security module to the mediator user responsive to a determination that collaborative authentication is required for the candidate user.

40. The method of claim 39, wherein the mediator user identifies the selected authenticating user.

41. The method of claim 25, wherein the interaction is an interaction between devices.

* * * * *